(12) United States Patent
Helmick et al.

(10) Patent No.: US 11,340,575 B2
(45) Date of Patent: May 24, 2022

(54) APPARATUS, SYSTEM, AND METHOD FOR PICKING, PLACING, AND MELTING SOLDER SLEEVES ONTO SHIELDED ELECTRICAL WIRES AND CABLES

(71) Applicant: The Boeing Company, Chicago, IL (US)

(72) Inventors: Eerik J. Helmick, Seattle, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1366 days.

(21) Appl. No.: 15/460,141

(22) Filed: Mar. 15, 2017

(65) Prior Publication Data

US 2018/0267498 A1 Sep. 20, 2018

(51) Int. Cl.
| | | |
|---|---|---|
| *H01R 43/04* | (2006.01) | |
| *G05B 19/19* | (2006.01) | |
| *H01R 43/02* | (2006.01) | |
| *H01R 43/28* | (2006.01) | |
| *H01R 43/05* | (2006.01) | |

(52) U.S. Cl.
CPC ......... *G05B 19/19* (2013.01); *H01R 43/0228* (2013.01); *G05B 2219/37582* (2013.01); *H01R 43/05* (2013.01); *H01R 43/28* (2013.01)

(58) Field of Classification Search
CPC .... G05B 19/19; H01R 43/0228; H01R 43/05; H01R 43/08
See application file for complete search history.

(56) References Cited

U.S. PATENT DOCUMENTS

| | | | |
|---|---|---|---|
| 3,396,455 A | 8/1968 | Sherlock et al. | |
| 3,427,433 A | 2/1969 | Foreman et al. | |
| 3,484,936 A | 12/1969 | Schwalm et al. | |
| 4,487,994 A | 12/1984 | Bahder | |
| 4,653,159 A | 3/1987 | Henderson et al. | |
| 5,083,370 A * | 1/1992 | Koch ..................... | H01R 43/20 29/753 |

(Continued)

FOREIGN PATENT DOCUMENTS

| | | |
|---|---|---|
| CN | 204760722 | 11/2015 |
| CN | 204792418 | 11/2015 |

(Continued)

OTHER PUBLICATIONS

Office Action dated Mar. 8, 2022 in corresponding Japanese application No. 2018-046397, 5 pages.

*Primary Examiner* — Helena Kosanovic
*Assistant Examiner* — Ahmad Abdel-Rahman
(74) *Attorney, Agent, or Firm* — Haynes and Boone, LLP

(57) ABSTRACT

Systems and methods are provided for wire processing. In certain examples, a wire processing system is disclosed. The wire processing system includes an electrical wire and solder sleeve joining system. The electrical wire and solder sleeve joining system includes an end effector configured to hold a solder sleeve and a split funnel configured to guide insertion of wire into the solder sleeve, allow movement of the solder sleeve through the split funnel in a second position, and prevent movement of the solder sleeve through the split funnel in a first position. The end effector can additionally be configured to remove a slug from the wire.

19 Claims, 13 Drawing Sheets

(56) References Cited

U.S. PATENT DOCUMENTS

| | | | | |
|---|---|---|---|---|
| 5,508,621 A | * | 4/1996 | Wong | G01R 27/14 324/549 |
| 6,266,870 B1 | * | 7/2001 | Wollermann | H01R 43/01 29/564.4 |
| 2005/0202721 A1 | | 9/2005 | Sakaue et al. | |
| 2012/0217036 A1 | | 8/2012 | Kuriyagawa | |
| 2016/0027552 A1 | | 1/2016 | Kuriyagawa et al. | |
| 2018/0174712 A1 | * | 6/2018 | Porter | H01B 13/012 |

FOREIGN PATENT DOCUMENTS

| | | |
|---|---|---|
| CN | 204793566 | 11/2015 |
| CN | 1710752 | 12/2015 |
| DE | 102009049132 | 5/2010 |
| JP | S57-182916 A | 11/1982 |
| JP | S58-145018 A | 8/1983 |
| JP | S59-230411 A | 12/1984 |
| JP | S63-146368 A | 6/1988 |
| JP | H6-275150 A | 9/1994 |
| JP | H8-264042 A | 10/1996 |
| JP | 2000-166046 | 6/2000 |
| JP | 2004-255463 A | 9/2004 |
| JP | 2010-158722 A | 7/2010 |
| JP | 2013196841 | 9/2013 |
| WO | WO 96-32568 | 10/1996 |

\* cited by examiner

APPARATUS, SYSTEM, AND METHOD FOR PICKING, PLACING, AND MELTING SOLDER SLEEVES ONTO SHIELDED ELECTRICAL WIRES AND CABLES

TECHNICAL FIELD

The disclosure relates generally to wire processing and more specifically, for example, to wire processing for wire harnesses used in aircraft.

BACKGROUND

High reliability is often needed for wiring harnesses such as those used in aircraft subsystems. The production processes used to fabricate such harnesses utilize high quality components such as high quality wires, connections, and connectors. Assembly of such high quality components is required to be performed in a repeatable manner that minimizes failure. Such high standards have traditionally rendered automated wire assembly systems impractical for fabricating aircraft wiring harnesses.

SUMMARY

Systems and methods are disclosed herein for wire processing. In certain examples, an apparatus for facilitating an insertion of a wire surrounded by shielding into a solder sleeve so as to prevent a dislocation of the shielding during insertion is disclosed. The apparatus includes an end effector including solder sleeve grippers, where the solder sleeve grippers are configured to move between at least a solder sleeve gripper open position and a solder sleeve gripper closed position configured to hold a solder sleeve, and slug puller grippers, where the slug puller grippers are configured to move between at least a slug puller gripper open position and a slug puller gripper closed position configured to hold a portion of a wire, and wherein the solder sleeve grippers and the slug puller grippers are configured to move independently of each other.

In certain other examples, a method for inserting a wire surrounded by shielding into a solder sleeve without dislocating the shielding can be disclosed. The method includes closing solder sleeve grippers of an end effector to a solder sleeve gripper closed position to hold a solder sleeve, moving the end effector to a location proximate a split funnel, moving a first portion and a second portion of the split funnel to a first position configured to prevent movement of the solder sleeve though the split funnel and allow movement of the wire through the split funnel, moving the split funnel and/or the end effector to insert the wire into the solder sleeve held by the solder sleeve grippers, closing, responsive to insertion of the wire into the solder sleeve, the slug puller grippers to a slug puller gripper closed position to hold a slug of the wire, moving the end effector to remove the slug from the wire, opening the slug puller grippers to the slug puller gripper open position, and opening the solder sleeve grippers to a solder sleeve gripper open position.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for wire processing are described in the disclosure herein in accordance with one or more examples. The wire processing system includes a plurality of processing stations and one or more of wire transports.

The systems and techniques described herein allow for improved wire processing in the manufacture of wire harnesses for aircraft applications. The systems and techniques described herein include a plurality of stations that manufacture such wire harnesses by performing one or more discreet steps in the manufacturing of such harnesses. Examples of such steps include receiving a coil of wire, stripping the wire at a predetermined area, inserting and/or positioning an electrical component over the stripped area, and soldering the electrical component over the stripped area. Certain other examples include additional steps in the manufacturing of such wire harnesses such as inserting the wire into a receptacle of a connector, soldering the wire to the connector, bundling together a plurality of wires, and attaching insulation to one or more wires.

While certain stations described herein can perform one step in the manufacture of such harnesses (e.g., stripping the wire at a predetermined area or positioning an electrical component over the stripped area), other stations can perform a plurality of discreet steps (e.g., positioning the electrical component over the stripped area and soldering the electrical component to the wire).

The stations described can also be modular stations. That is, the stations can be arranged as needed due to the requirements of the wire harness manufacturing steps. Accordingly, if two electrical components need to be soldered to the wire, then two such stations or sets of stations performing steps involved in soldering the electrical components to the wire can be used in the system.

As an illustrative example, such a wire processing system includes, at least, a wire transport that receives wire and transports the wire between various stations for processing. The system further includes a station that provides wire to the wire transport, a station that provides an electrical component to the wire and/or moves the electrical component on the wire, a station that strips a portion of the wire, a station that positions the electrical component over the stripped portion of the wire, and a station that solders the electrical component to the wire. Other examples can include other or additional stations and can arrange the stations in any number of ways.

Figure 1:
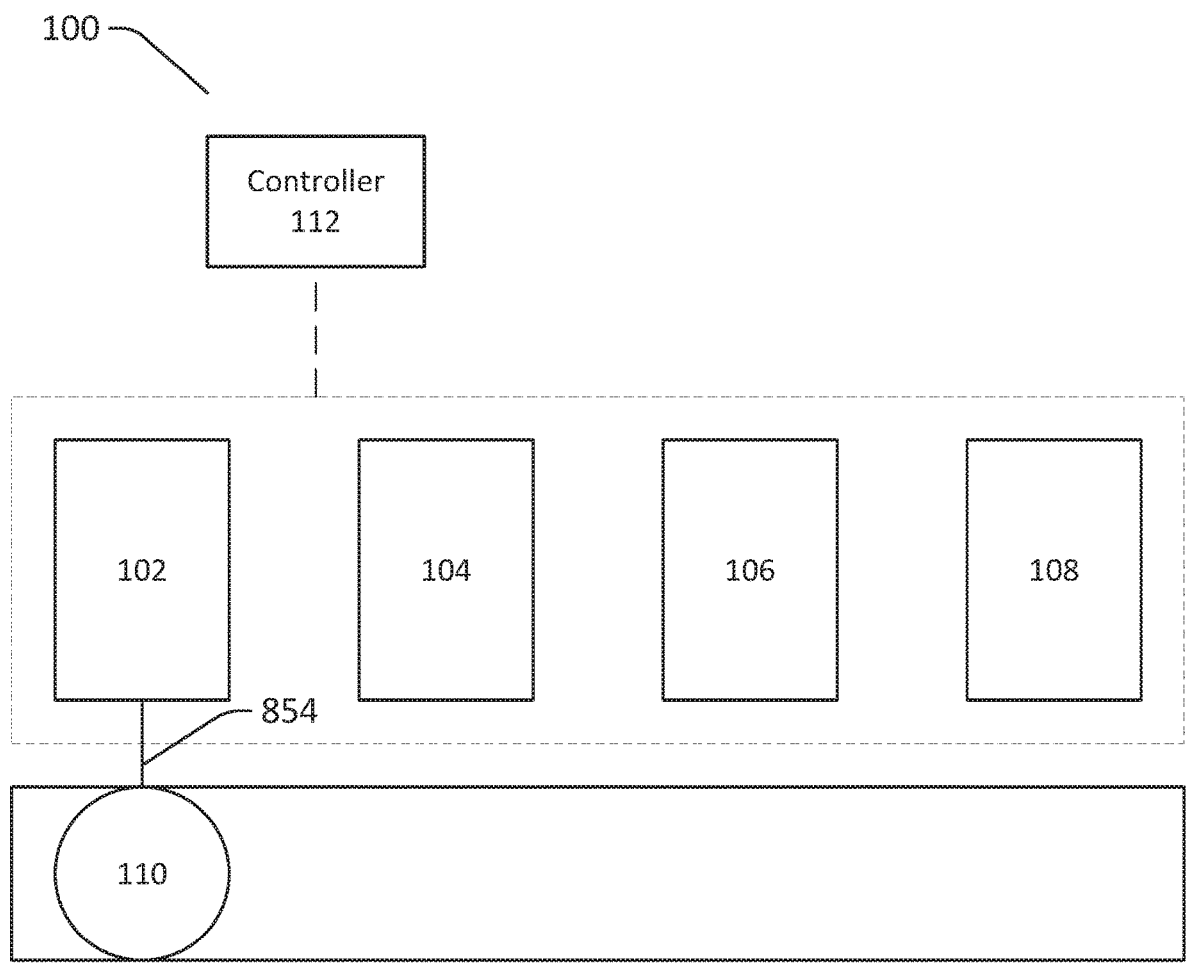
FIG. 1 illustrates a view of a wire processing system in accordance with an example of the disclosure.

As an illustrative example, a wire processing system is illustrated in FIG. 1. FIG. 1 illustrates a perspective view of a wire processing system 100 in accordance with an example of the disclosure. Wire processing system 100 includes a first station 102, a second station 104, a third station 106, a fourth station 108, and a wire transport 110A.

Stations 102-108 include one or more different types of wire processing stations. For example, such stations can provide wire to one or more rotational wire transports, cut wires, strip wires, slice wires, solder wires, attach one or more components (e.g., solder sleeves, connectors, Printed Circuit Boards (PCBs), and/or other such components) to the wires, and/or perform other wire processing and/or manufacturing steps. In certain such examples, the wire transport 110 is configured to receive wire 854 at one station and move the wire 854 to another station for further processing.

Station 102 is a station that provides the wire 854 to the wire transport 110. In the illustrated example, station 102 is providing wire 854 to wire transport 110. The wire 854 provided can be coiled around and/or within the wire transport 110. In certain examples, at least a portion of the wire 854 provided is held within a wire retaining tray of the wire transport 110.

In the illustrated example, the wire transport 110 can then move to a subsequent station, such as, for example, station 104, for further processing. It should be realized that in the illustrated embodiment, the processing system 100 is configured as an assembly line, such that after wire transport 110 receives the wire from station 102, wire transport 110 moves from station 102 to station 104 as described below.

The wire transport 110 then moves to another station, such as for example, station 104. The wire transport 110, in a certain example, moves between stations via one or more rails. As such, the wire transport 110 can be coupled to the one or more rails and the one or more rails can guide movement of the wire transport. The one or more rails can include mechanisms that move the wire transports and/or the wire transports themselves can include such mechanisms to move the wire transports between stations.

In the example shown in FIG. 1, station 104 is configured to receive the wire 854 and cut the wire 854 and/or strip a portion of the wire 854 (e.g., a portion of the insulation and/or shielding). Station 104, in certain examples, includes mechanisms that bottom against (e.g., physically contact) one or more bottoming features of the wire transport 110 and, from such bottoming features, then determine the area of the wire 854 to be stripped. As such, in certain such examples, a portion of the station 104 is configured to bottom against the feature, position itself against the bottoming feature to determine the portion of the wire 854 to be cut, cut the wire 854, and strip the wire 854 according to the position of the wire 854 relative to the bottoming feature.

The wire transport 110 then moves to station 106. In such an example, station 106 receives the wire transport 110 and positions the wire 854 of the wire transport 110 in an orientation to thread an electrical component onto the wire 854 and/or position the electrical component onto the stripped portion of the wire 854. The electrical component is installed on the wire 854 such that the electrical component is movable along a length of the wire. In further examples, the electrical component can be pre-installed on the wire, installed by hand, or installed using another technique. In such an example, the electrical component is then positioned over the stripped portion of the wire 854 in station 106.

The wire transport 110 then moves to station 108. Station 108 is configured to, for example, solder the electrical component onto the stripped portion of the wire 854. Other examples may solder the electrical component onto the stripped portion of the wire 854 in other stations (e.g., in station 106). In certain other examples, other stations can, alternatively or additionally, perform other actions (e.g., couple one or more connectors to the wire, couple the wire to one or more other wires to form a harness, solder the wire to another wire or other electrical component, affix one or more identifying components such as stickers, print installation or other identifying information on the wire, and/or perform other such actions). Also, other examples can position one or more stations 102-108 in orders different from that described herein. Certain such examples can include fewer and/or additional stations.

In certain examples, one or more controllers (e.g., a controller 112) are configured to control the operation of the wire processing system 100 and/or one or more systems and/or subsystems thereof. The controller 112 includes, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 112 and/or its associated operations can be implemented as a single device or multiple devices (e.g., communicatively linked through analog, wired, or wireless connections such as through one or more communication channels) to collectively constitute the controller 112.

The controller 112 can include one or more memory components or devices to store data and information. The memory can include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 112 can be adapted to execute instructions stored within the memory to perform various methods and processes described herein.

Figure 2:
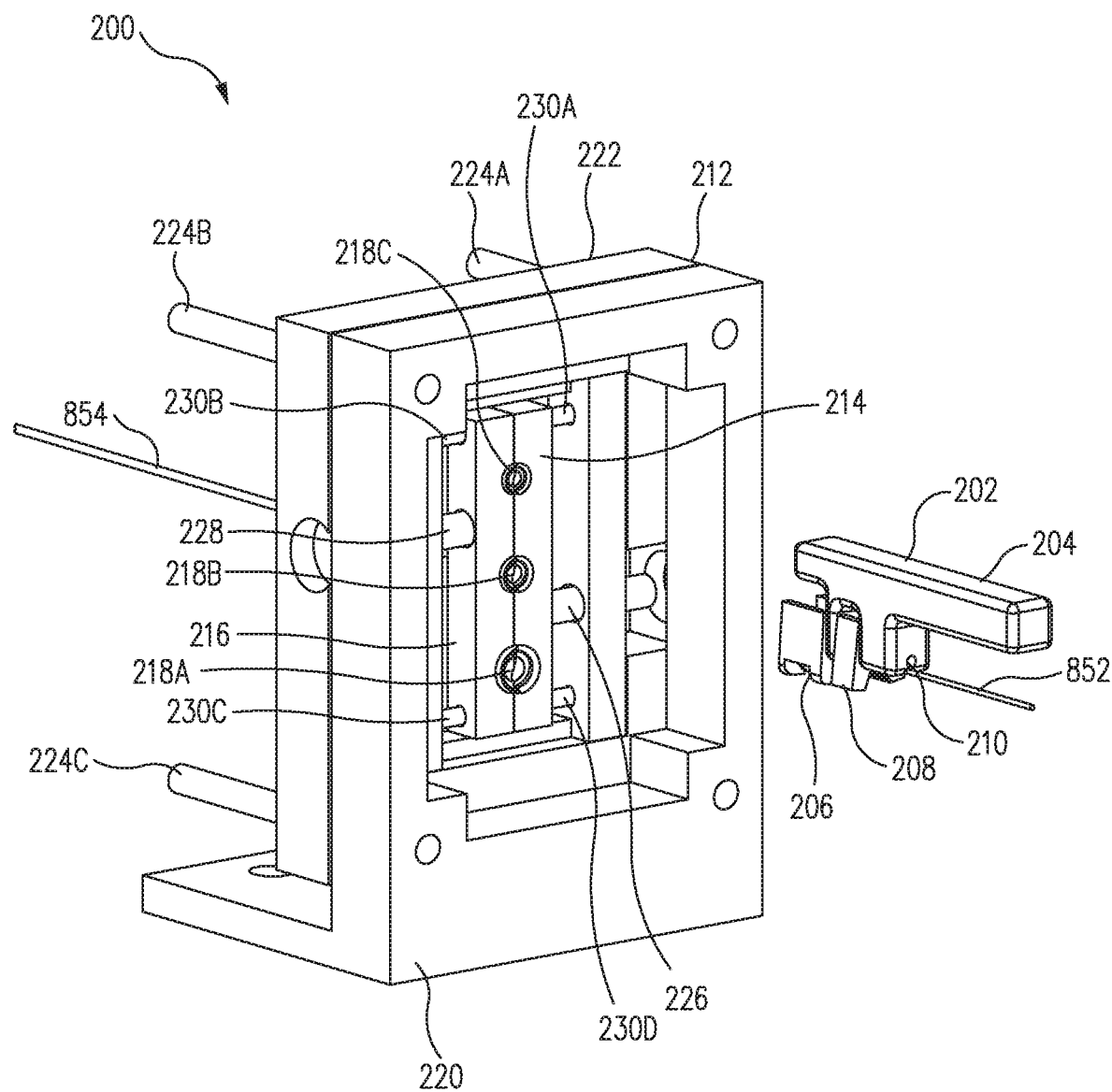
FIG. 2 illustrates a view of an electrical wire and solder sleeve joining system in accordance with an example of the disclosure.

FIG. 2 illustrates a view of an electrical wire and solder sleeve joining system in accordance with an example of the disclosure. Various aspects of the electrical wire and solder sleeve joining system illustrated in FIG. 2 can be configured to hold an electrical component (e.g., solder sleeve), allow wire to be threaded through the electrical component, and remove a slug (e.g., previously scored) portion of the wire after insertion of the wire into the electrical component. FIG. 2 illustrates an electrical wire and solder sleeve joining system 200 with an end effector 202 and a split funnel 212. Additionally, the end effector 202 holds an electrical component 852, and the split funnel 212 holds a wire 854.

The apparatuses, systems, and techniques described herein can be used for processing of wires (e.g., a single conductor surrounded by insulation) and/or cables (e.g., multiple conductors surrounded by insulation). Such wires and/or cables can include insulation and/or shielding. It is appreciated that this disclosure refers to "wires" generically. As such, for the purposes of this disclosure, "wire" may refer to any conductor, including conductors with insulation and/or shielding, such as a single conductor with insulation and/or shielding (e.g., a wire) or multiple conductors with insulation and/or shielding (e.g., a cable), respectively.

The end effector 202 includes a handle 204, solder sleeve grippers 206, slug puller grippers 208, and fasteners 210 that couple the solder sleeve grippers 206 and/or the slug puller grippers 208 to the handle 204.

The handle 204 is configured to be coupled to one or more components of a robotic system or assembly (e.g., an arm of a robotic system or assembly) and/or is a component of such a robotic system or assembly. The handle 204 is coupled to the solder sleeve grippers 206 and/or the slug puller grippers 208 through one or more fasteners 210 (e.g., studs, bolts, bearings, dowels, pins, rivets, and/or other such fasteners).

The solder sleeve grippers 206 are configured to move between at least a solder sleeve gripper open position and a solder sleeve gripper closed position. Other examples of the solder sleeve grippers 206 can include other positions, including intermediate positions and/or additional open and/or closed positions so that the solder sleeve grippers 206 are configured to hold electrical components of a plurality of different sizes. The solder sleeve grippers 206 can, for example, include one or more rotatable and/or translatable arms (e.g., two arms as shown in FIG. 2) that, in the solder sleeve gripper open position, can be positioned around the electrical component 852. The one or more arms of the solder sleeve grippers 206 can then close (e.g., rotate and/or translate) the solder sleeve grippers 206 to the solder sleeve gripper closed position to hold the electrical component 852. Certain examples of the solder sleeve grippers can include one or more non-moving features such as walls that the electrical components can be pinned against.

The slug puller grippers 208 are configured to move between at least a slug puller gripper open position and a slug puller gripper closed position. Other examples of the slug puller grippers 208 can include other positions, including intermediate positions. The slug puller grippers 208 can, for example, include one or more rotatable and/or translatable arms (e.g., two arms as shown in FIG. 2) that, in the slug puller gripper open position, can be positioned around the wire 854. The one or more arms of the slug puller grippers 208 can then close (e.g., rotate and/or translate) the slug puller grippers 208 to the slug puller gripper closed position to hold the wire 854. Certain examples of the slug puller grippers can include one or more non-moving features such as walls that the electrical components can be held against.

The slug puller grippers 208 are configured to hold a portion of the wire 854. In certain examples, the slug puller grippers 208 are configured to hold a slug of the wire 854. The slug is a piece of protective insulation and/or shielding of the wire 854 that is scored, but not yet removed from the wire 854. In certain examples, the slug is a piece of protective insulation and/or shielding disposed over and/or around the conductive portions of the wire 854. The slug can be a scored portion of the insulation and/or shielding of the wire 854 (e,g, a scored portion of the insulation on a distal end of the wire 854). As such, the slug can be separated from the remaining insulation and/or shielding of the wire 854, but the slug is not yet removed from the wire 854 while the wire 854 is inserted into the electrical component 852. Thus, the slug can be, for example, a piece of scored insulation (e.g., a portion of a jacket of the wire 852 such as the insulating rubber portion that, in certain examples, extends across the distal edge of the shielding of the wire 854) that can protect shielding underneath the slug from deformation during insertion of the wire 854 into the electrical component 852. Leaving such a removable slug over the shielding prevents the shielding from catching on a portion of the solder sleeve joining system 200 and/or the electrical component 852 during insertion. After the wire 854 has been inserted into the electrical component 852, the slug can then be removed by the slug puller grippers 208 by, for example, pulling the slug (the cut portion of the insulation) distally off of the wire 854.

To remove the slug, the slug puller grippers 208 move to the slug puller gripper closed position while positioned over the slug. After the slug puller grippers 208 are in the slug puller griper closed position, the end effector 202 can then move (e.g., translate) from a first end effector position to a second end effector position. Doing so can then move the slug on the wire 854. The slug puller grippers 208 can then open to the slug puller gripper open position, move back to the first end effector position, be closed to the slug puller gripper closed position to further hold a portion of the slug, and the end effector 202 can then move back to the second end effector position. Such an action can be repeated until the slug is removed from the wire 854. Certain examples can have the solder sleeve grippers 206 open to release the electrical component 852 before the slug puller grippers 208 remove the slug and/or fully remove the slug. Other examples can have the solder sleeve grippers 206 continue to hold the electrical component 852 during at least a portion of the period that the slug is being removed by the slug puller grippers 208. For the purposes of this disclosure, the slug puller grippers 208 and the solder sleeve grippers 206 can hold and/or release the slug and electrical component 852, respectively, independently of each other.

Separately or concurrently, the solder sleeve grippers 206 can hold and move the electrical component 852. For example, the end effector 202 can move from the first end effector position to the second end effector position while the solder sleeve grippers 206 are in the solver sleeve gripper closed position, open the solder sleeve grippers 206 to the solder sleeve gripper open position, move the end effector 202 back to the first end effector position, close the solder sleeve grippers 206 to the slug puller gripper closed position to further hold a portion of the electrical component 852, and the end effector 202 can then move back to the second end effector position. Doing so, the electrical component 852 can then be positioned over at least a portion of the exposed portion of the wire 854 (e.g., the position that the slug was removed from).

The split funnel 212 includes a first portion 214 and a second portion 216, a base 220, and a funnel housing 222. The first portion 214 and the second portion 216 are coupled to the funnel housing 222 via actuators 230A-D. As such, movement of the funnel housing 222 also moves the first portion 214 and the second portion 216. The funnel housing 222 is also coupled to the base 220 via actuators 224A-D so that the funnel housing 222 can move relative to the base 220. The actuators 230A-D and/or 224A-D can be any type of actuator that can move the first portion 214, the second portion 216, and/or the funnel housing 222 including spring-loaded, pneumatic, mechanical, motor powered (e.g., electric motor powered), and/or other such actuators.

The first portion 214 and the second portion 216 can be configured to move between at least a first position and a second position. In the example shown, the first portion 214 and the second portion 216 can translate between the first position and the second position. Guides 226 and 228 are features of the second portion 216 and the first portion 214, respectively, that guides the translation of the first portion 214 and the second portion 216.

The first position is a position where the first portion 214 is disposed closer to the second portion 216 than in the second position. In the first position, the first portion 214 and the second portion 216 define one or more openings (e.g., openings 218A-C) that are configured to allow a wire to pass through. The one or more openings 218A-C may also be configured to each prevent an electrical component of a certain size from passing through.

In examples with a plurality of openings, one or more openings may be of different sizes to prevent electrical components of different sizes from passing through. In such examples, the end effector 202 can be configured to determine the size of the electrical component that the end effector 202 is holding (e.g., from one of more sensors coupled to the end effector 202, from an operator input, and/or through a determination from where the end effector 202 received the electrical component). Responsive to determining the size of the electrical component after receiving the electrical component, the end effector 202 then moves next to a corresponding opening (e.g., the opening sized to prevent movement of the electrical component through the opening when the first portion 214 and the second portion 216 are in the first position).

While next to the corresponding opening, the wire 854 is inserted into the electrical component 852. The wire 854 can be inserted into the electrical component 852 through moving the wire 854 towards the electrical component 852, moving the funnel housing 222 and/or the end effector 202 towards the wire (e.g., the funnel housing 222 moves towards the wire 852 and away from the base 220 via actuators 224A-D while the wire 852 is held stationary), or a combination of both. The openings may include features to aid in the insert of the wire 854 into the electrical component 852 such as one or more rounds and/or chamfers.

Figure 3A:
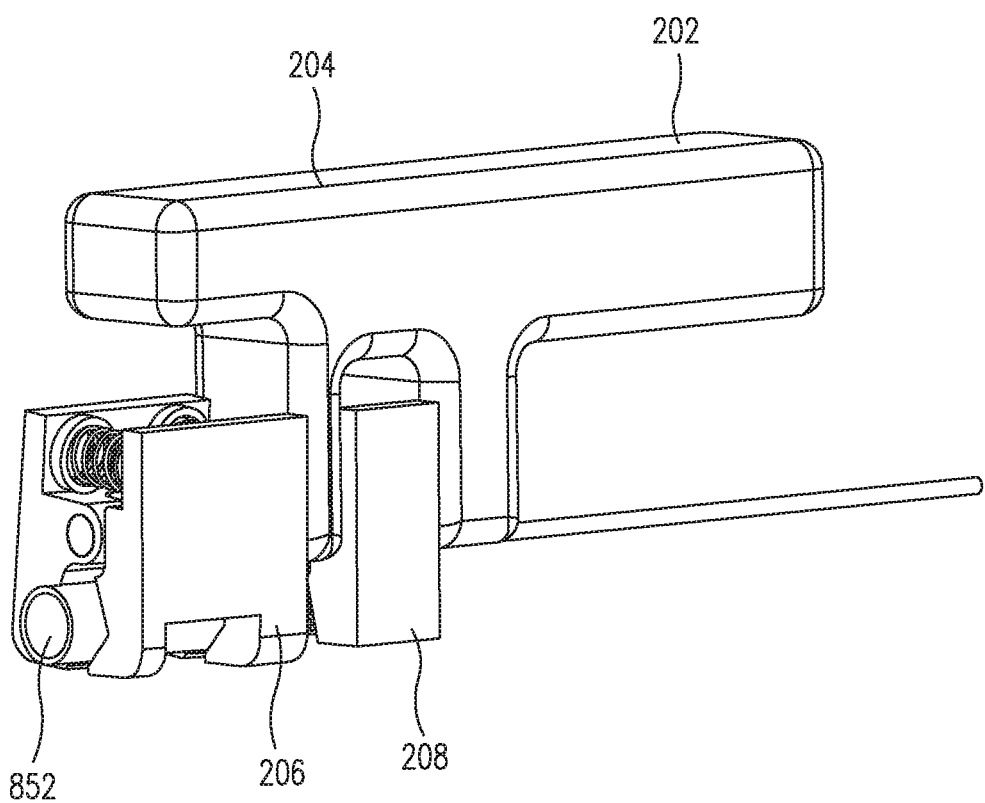
FIGS. 3A-C illustrate various views of an end effector of the electrical wire and solder sleeve joining system in accordance with an example of the disclosure.
Figure 3B:
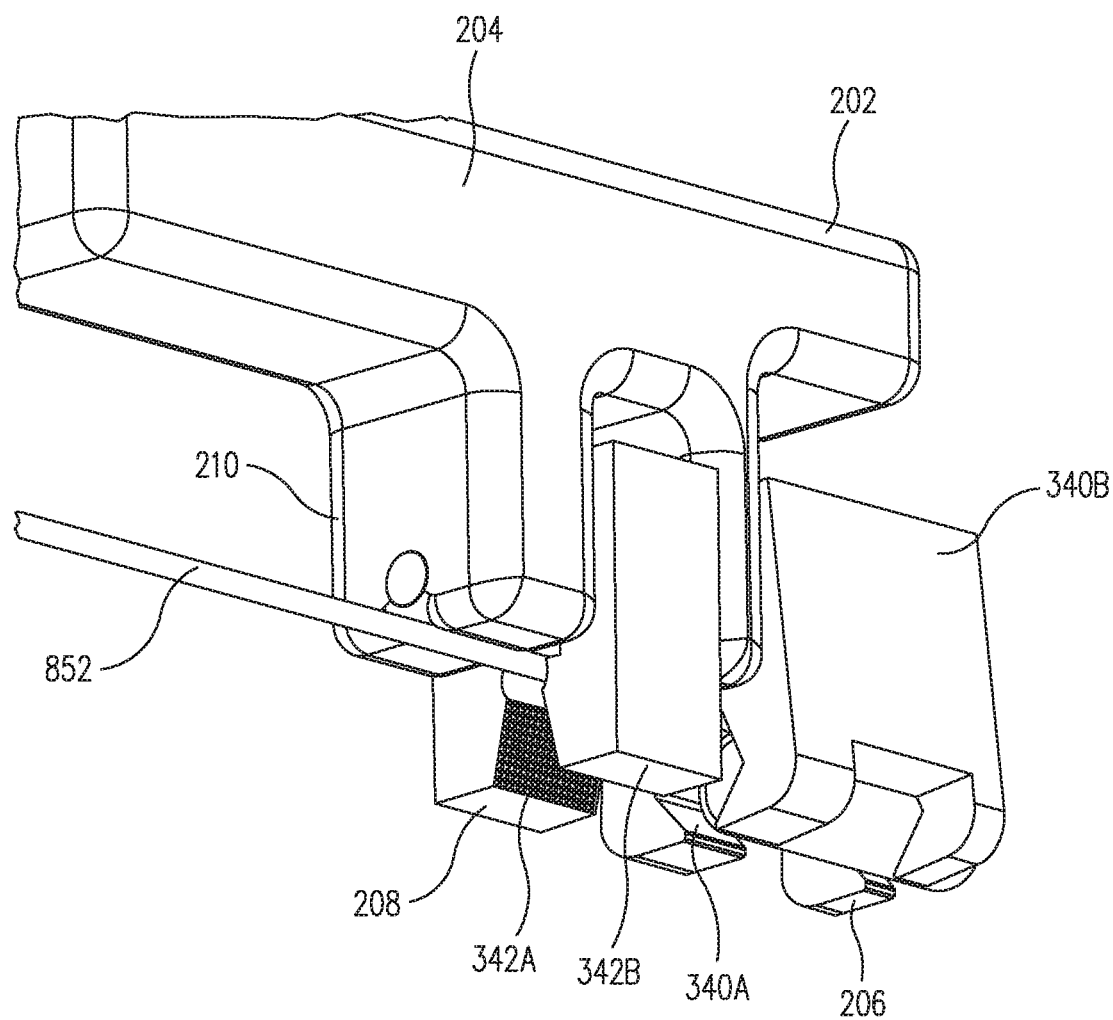
Figure 3C:
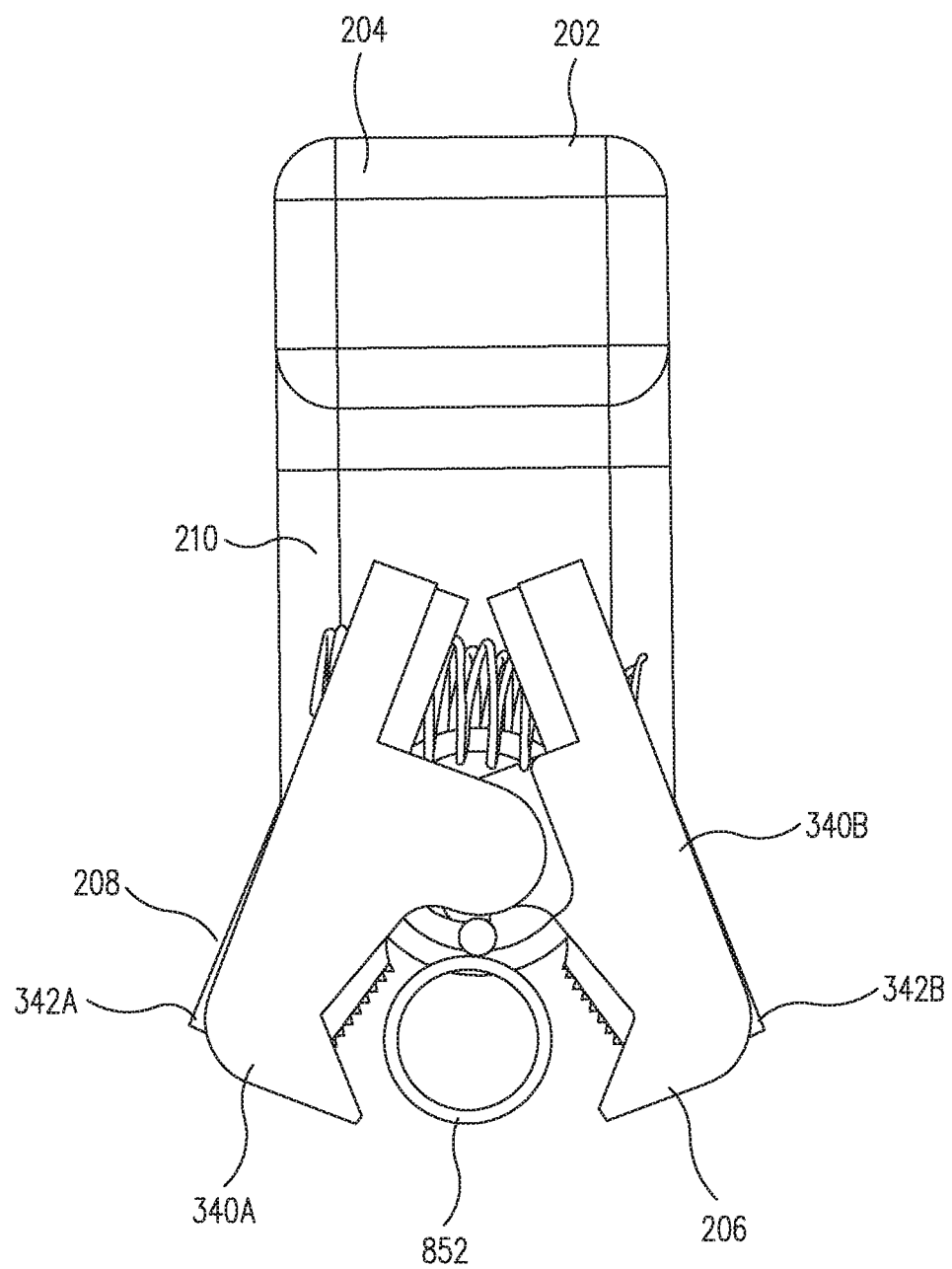

FIGS. 3A-C illustrate various views of an end effector of the electrical wire and solder sleeve joining system in accordance with an example of the disclosure. FIGS. 3A-C illustrate the end effector 202 shown in FIG. 2. The end effector 202 includes the handle 204, solder sleeve grippers 206, slug puller grippers 208, and fasteners 210 that couple the solder sleeve grippers 206 and/or the slug puller grippers 208 to the handle 204.

As shown in FIGS. 3A-C, the electrical component 852 is a solder sleeve and includes a pigtail. The handle 204 and the slug puller grippers 208 include features (e.g., cutouts and/or openings) configured to allow the pigtail to pass through and thus, avoid contact with the handle 204 and the slug puller grippers 208.

As shown in FIGS. 3B and 3C, the solder sleeve grippers 206 include the solder sleeve gripper arms 340A and 340B. The slug puller grippers 208 include the slug puller gripper arms 342A and 342B. The solder sleeve gripper arms 340A and 340B are opposed to each other and the slug puller gripper arms 342A and 342B are opposed to each other and each are configured to rotate to move between the solder sleeve gripper open and closed positions and the slug puller gripper open and closed positions, respectively. Also, as shown in FIGS. 3A-C, the solder sleeve grippers 206 and/or the slug puller grippers 208 are spring loaded so that the solder sleeve grippers 206 and/or the slug puller grippers 208 are configured to default to an open position, a closed position, and/or another position.

FIG. 3C shows the solder sleeve grippers 206 in the solder sleeve gripper open position. In the solder sleeve gripper open position, the electrical component 852 can pass through the solder sleeve grippers 206 to be held and/or dropped by the solder sleeve grippers 206.

Also, in certain examples, the solder sleeve grippers 206 and/or the slug puller grippers 208 include one or more heating elements. Such heating elements are configured to heat the electrical component 852 to solder and/or melt the electrical component 852 to the wire 854. Other examples can solder and/or melt the electrical component 852 to the wire 854 through other mechanisms.

FIGS. 4A-G illustrate operation of the electrical wire and solder sleeve joining system in accordance with an example of the disclosure. The example operation of FIGS. 4A-G represent one non-limiting example of an electrical wire and solder sleeve joining system.

Figure 4A:
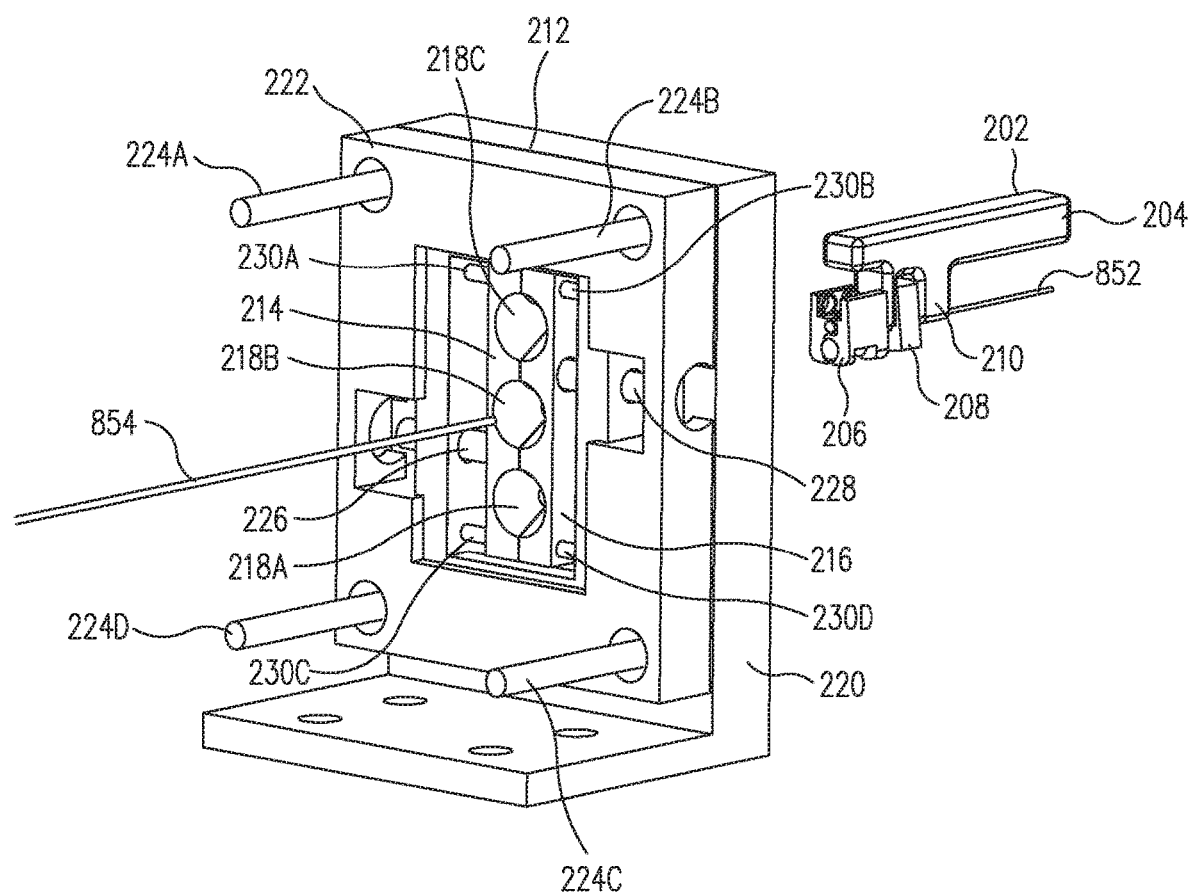
FIGS. 4A-G illustrate operation of the electrical wire and solder sleeve joining system in accordance with an example of the disclosure.

In FIG. 4A, the wire 854 is positioned in front of the first portion 214 and the second portion 216 of the split funnel 212. In FIG. 4A, the first portion 214 and the second portion 216 are spring loaded closed and the funnel housing 222 is spring loaded against the base 220. The end effector 202 holds the electrical component 852 and is ready to engage the split funnel 212 and the wire 854.

In certain examples, the end effector 202 will pick up the electrical component 852 from a tape and reel system and/or a vibratory table (e.g., a shaker table with an overhead camera system to identify the location of electrical components within the table). Such a tape and reel system and/or vibratory table can include electrical components of a plurality of different sizes. The end effector 202 and/or the controller 112 can be configured to determine the size of the electrical component 852 received by the end effector 202 and then move the end effector 202 to the opening (e.g., one of the openings 218A-C) of the split funnel 212 that corresponds to the size of the electrical component 852.

Figure 4B:
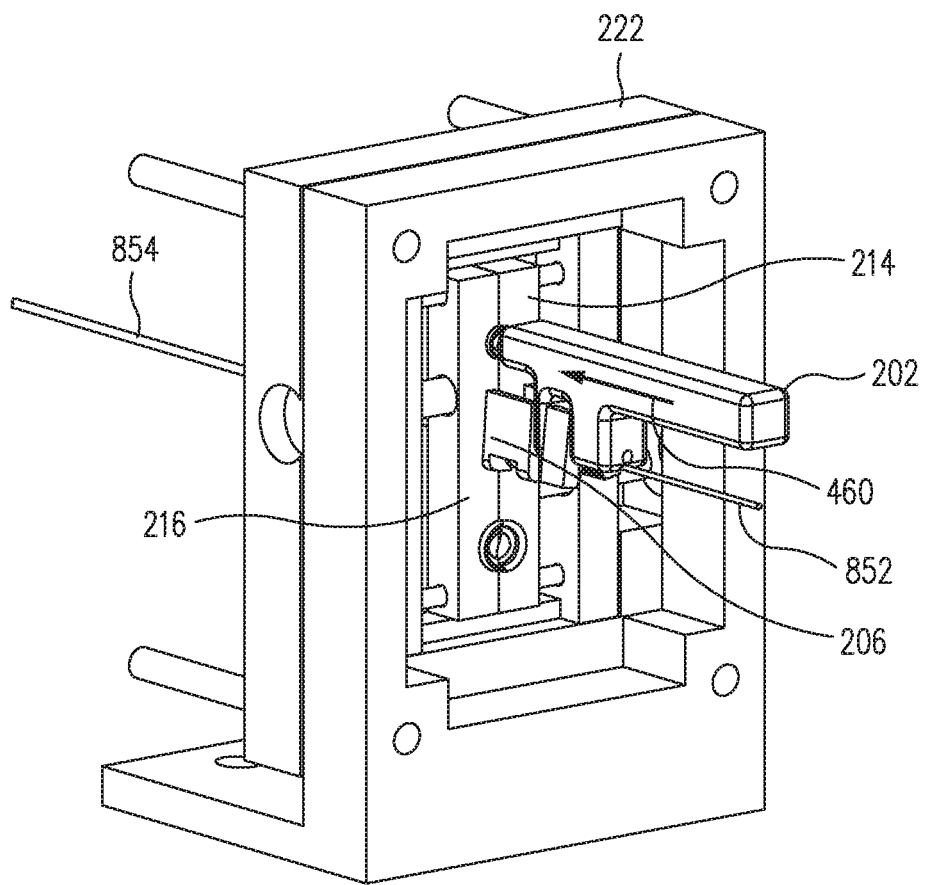

In FIG. 4B, the end effector 202 is moved towards the split funnel 212 while the end effector 202 grips the electrical component 852. For example, the end effector 202 can be a portion of a robot arm and the robot arm moves the end effector 202 towards the split funnel 212 in direction 460. Such a robot is programmed to travel to the appropriate opening of the split funnel 218A-C depending on the size of the electrical component 852. In certain examples, the end effector 202 is configured to move to one position and the funnel housing 222 is configured to move up and down to position the appropriate opening in front of the end effector 202 and/or the wire 854. The wire 854 can be aligned with the appropriate opening and the electrical component 852 so that translation of the opening and/or the electrical component 852 inserts the wire 854 into the electrical component 852.

Figure 4C:
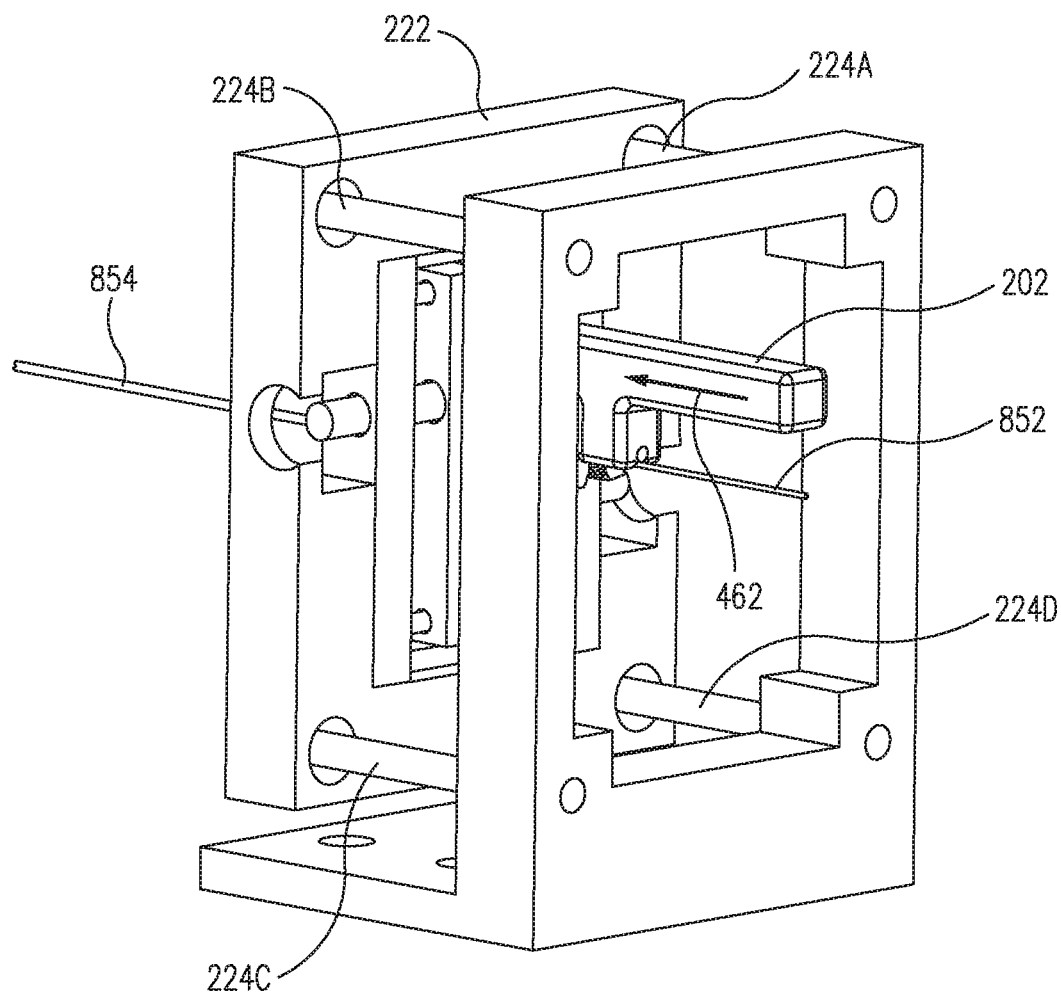

In FIG. 4C, the split funnel 212 (which is spring loaded) is actuated towards the wire 854 by the movement of the end effector 202. As such, the end effector 202 pushes against the split funnel 212 and thus moves the split funnel 212 and the end effector 202 in direction 462. Such movement pushes the wire 854 into the opening that the wire is align with (in this case, opening 218B) and through the opening within the electrical component 852. In certain examples, the openings 218A-C include features such as rounds and/or chamfers to further aid in insertion of the wire 854 into the openings and to thread the wire 854 into the electrical component 852. The rounds and/or chamfers can be positioned on the side of the split funnel 212 opposite that of where the end effector 202 is configured to move to.

Figure 4D:
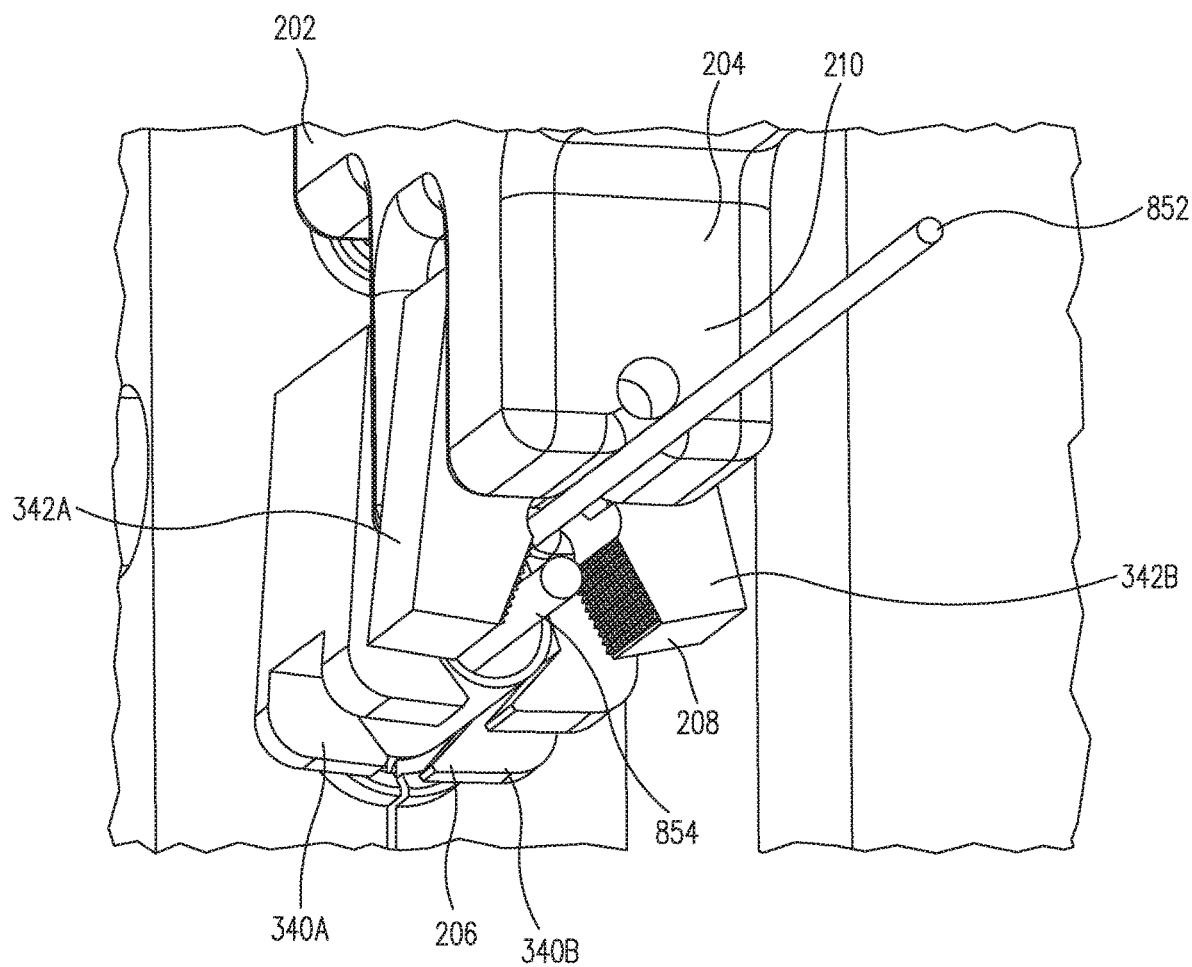

In FIG. 4D, the solder sleeve gripper arms 340A and 340B are closed around the electrical component 852 and the slug puller gripper arms 342A and 342B are open. The wire 854 has been inserted and/or threaded into or is in the process of being inserted and/or threaded into the opening of the electrical component 852.

In certain existing processes, the exposed shielding of wires can be caught on an electrical component's edge. This causes the shielding to fold over and fail to meet certain requirements (e.g., Federal Aviation Authority and/or manufacturer requirements). Using the systems, apparatus, and techniques disclosed herein, a partial slug (e.g., piece of protective insulation) can be left over the shielding so that the shielding is not exposed. A separate module can score the insulation but not remove it. Thus, the electrical component 852 can slide over the insulation and/or shielding of the wire 854 smoothly. Then, once the wire 854 is fully inserted into the electrical component 852, the slug puller gripper arms 342A and 342B of the slug puller grippers 208 can hold the slug, and the end effector 202 can move to remove the remaining insulation and/or shielding of the wire 854. Such a process then leaves a portion of the wire 854 that includes exposed shielding undisturbed.

Figure 4E:
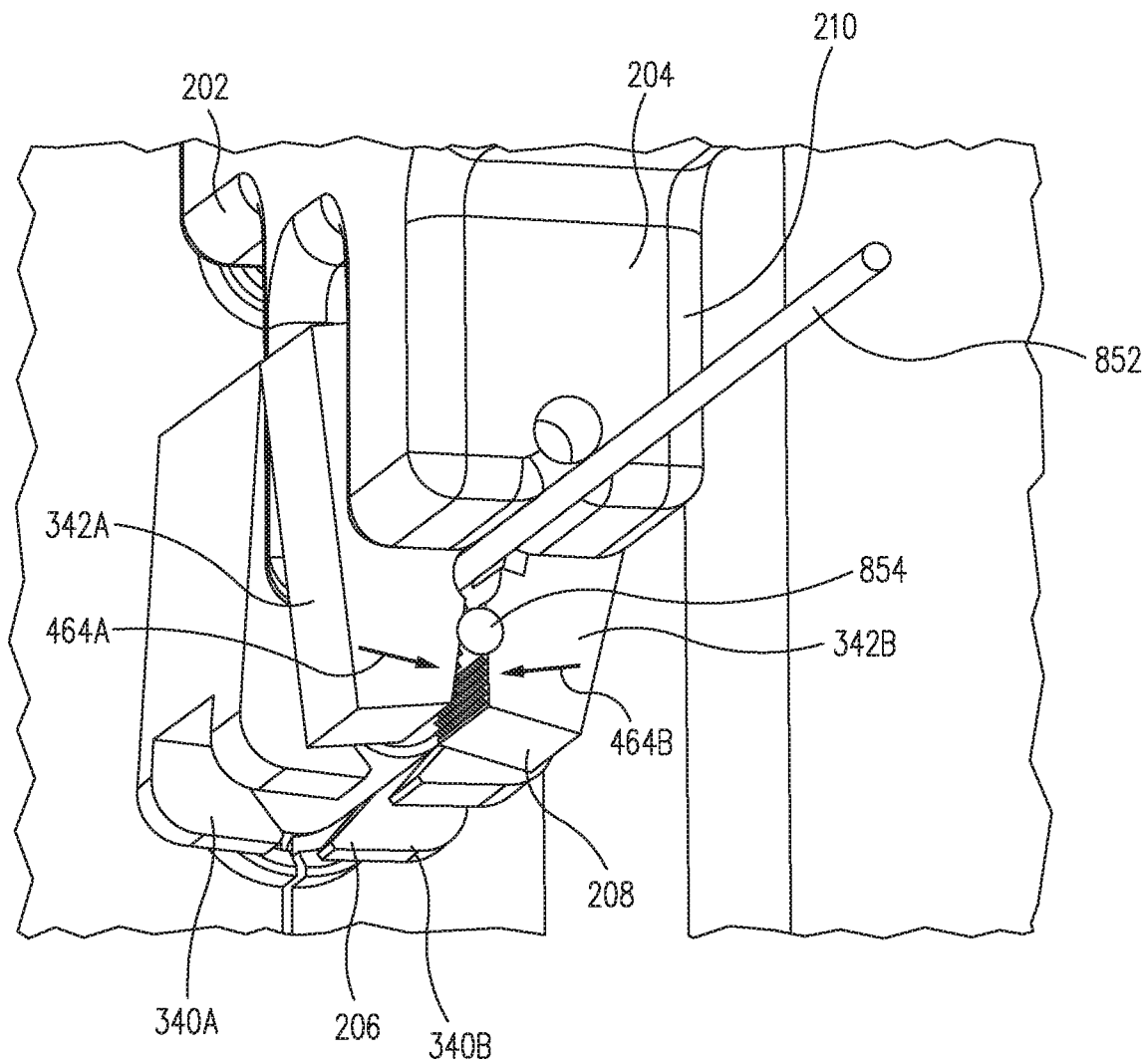

In FIG. 4E, the slug puller grippers 208 engage the slug to pull the slug off of the wire 852 by rotating the slug puller gripper arms 342A and 342B in directions 464A and 464B, respectively. In certain examples, the end effector 202 and/or the split funnel 212 can move slightly past the final resting point of the electrical component 852 relative to the wire 854 in order to engage the slug (e.g., holding the slug with the slug puller gripper arms 342A and 342B) before pulling it off. The end effector 202 and/or the split funnel 212 can then move to position the electrical component 852 in the intended position on the wire 854 before releasing the electrical component 852. The electrical component 852 can be melted and/or soldered in place by a heat or light source after the electrical component 852 has been placed in the intended position. Such heating and/or soldering can be performed after the electrical component 852 has been positioned in the intended position, and before and/or after the solder sleeve gripper arms 340A and 340B have released the electrical component 852.

Figure 4F:
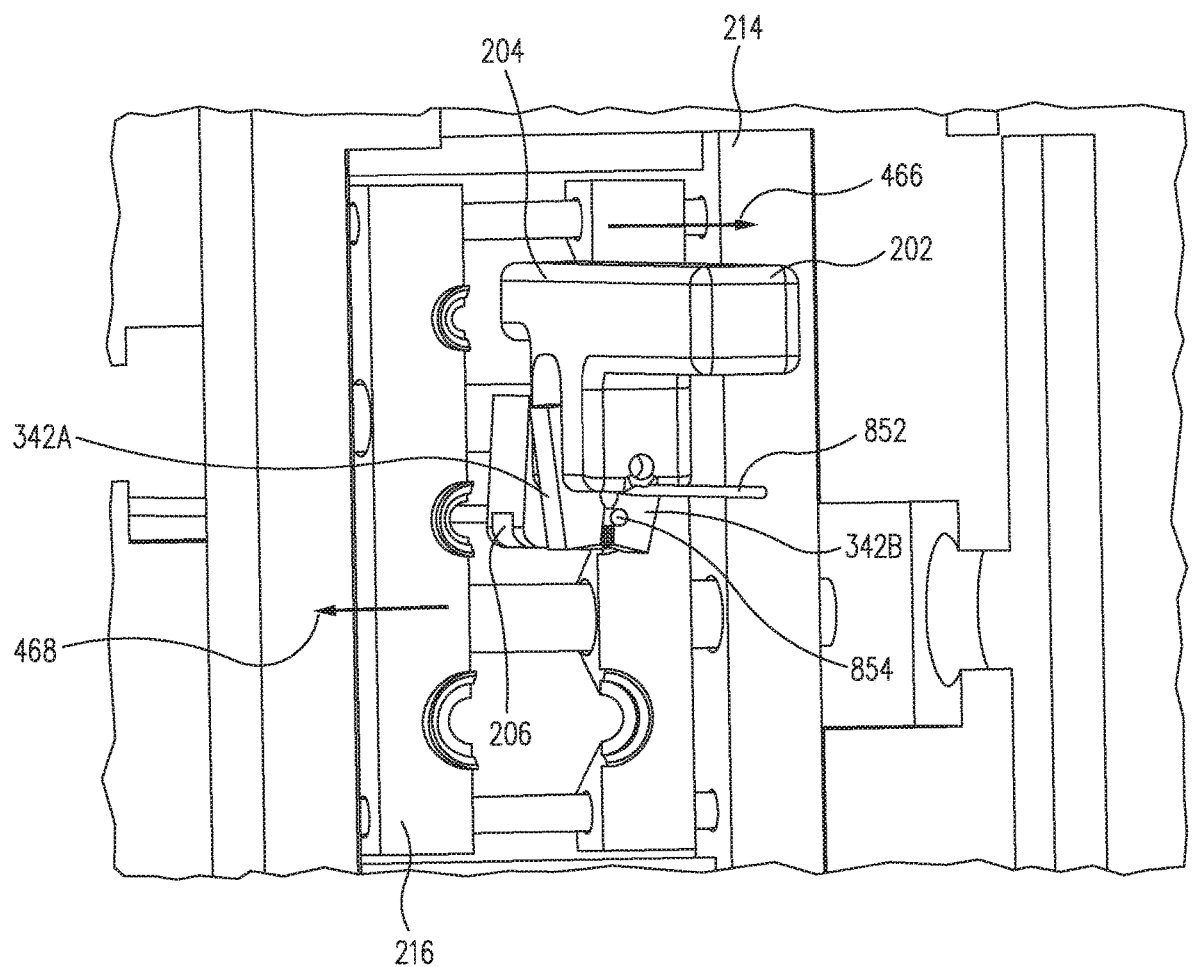

In FIG. 4F, after the electrical component 852 has been placed in the intended position, the first portion 214 and the second portion 216 moves in directions 466 and 468, respectively, to open the split funnel 212. Opening the split funnel 212 allows the electrical component 852 to remain on the wire 854 while the end effector 202 and/or the split funnel 212 retracts away from the wire 852.

Figure 4G:
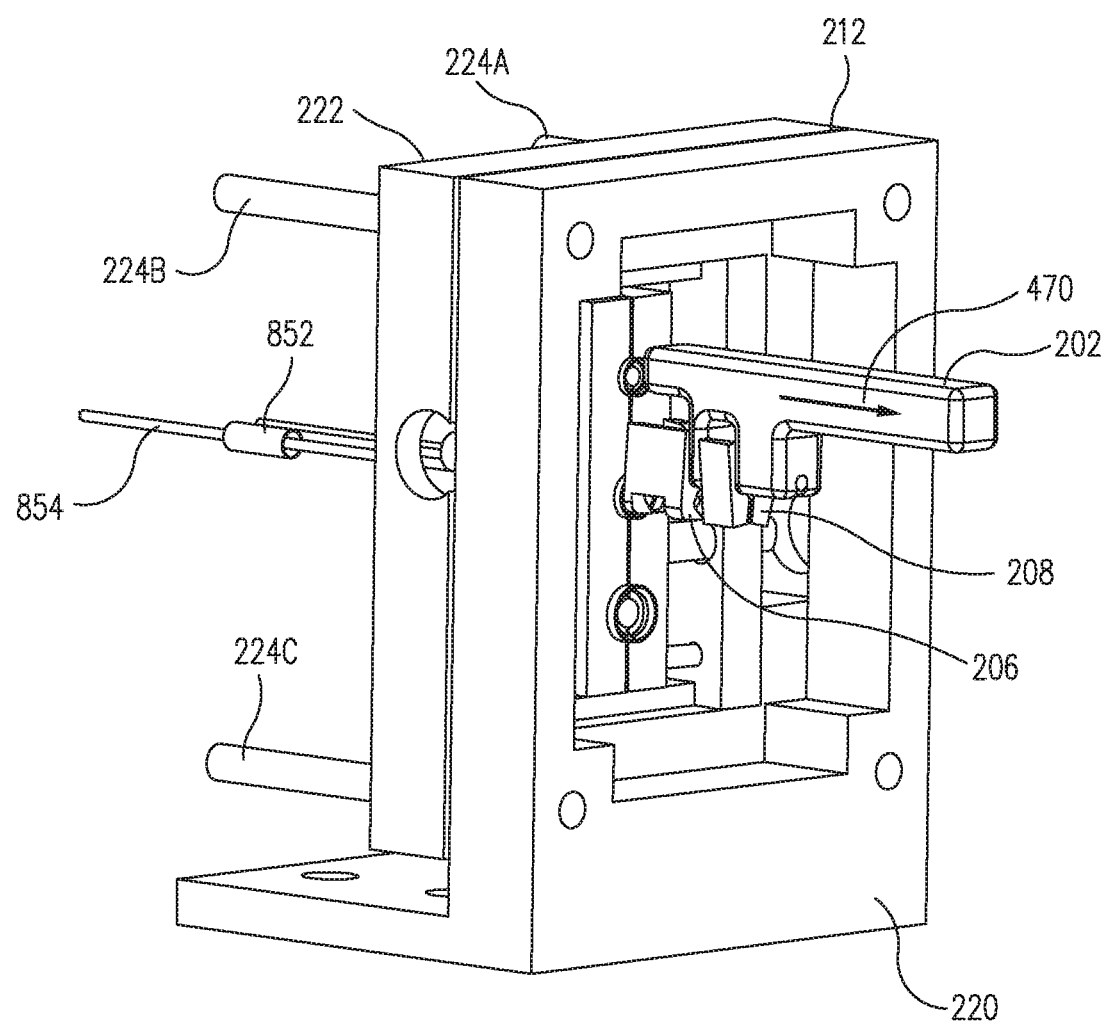

In FIG. 4G, the end effector 202 and/or the split funnel 212 moves in direction 470 to retract away from the wire 852. The electrical component 854 remains on the wire 852 in the intended position.

Figure 5:
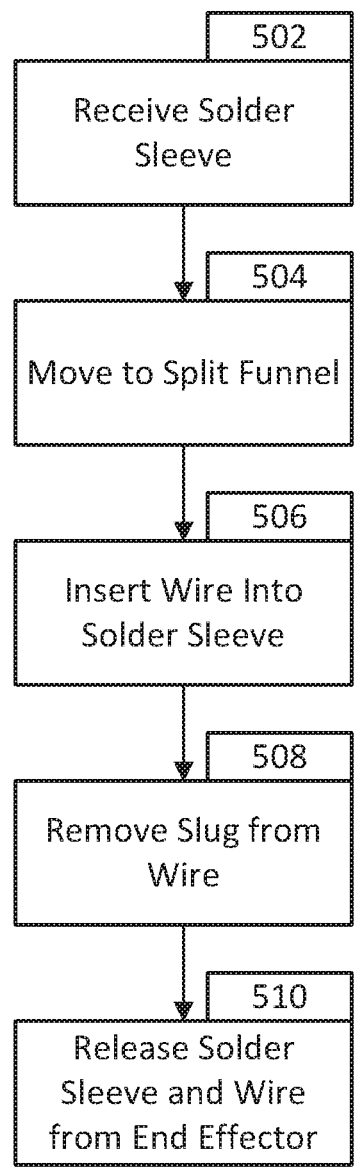
FIG. 5 is a flowchart detailing operation of the electrical wire and solder sleeve joining system in accordance with an example of the disclosure.

FIG. 5 is a flowchart detailing operation of the electrical wire and solder sleeve joining system in accordance with an example of the disclosure. In block 502, an end effector receives a solder sleeve from a tape and reel and/or vibratory table containing the solder sleeve. The solder sleeve can hold the solder sleeve with the solder sleeve grippers of the end effector. Block 502 can correspond to FIG. 4A.

In block 504, the end effector moves to a location proximate to that of the split funnel. In block 504, the split funnel is in a position that prevents movement of the solder sleeve through one or more openings within the split funnel. Block 504 can correspond to FIG. 4B.

After the end effector moves to the location proximate to the split funnel, a wire and/or cable is inserted into the solder sleeve held by the end effector in block 506. The wire and/or cable can be inserted into the solder sleeve by, for example, aligning the solder sleeve to wire (e.g., the opening of the solder sleeve can be aligned to the wire so that translating the solder sleeve will thread the wire into the opening of the solder sleeve) and moving the split funnel and the end effector towards the wire so that the wire is inserted into the solder sleeve. The split funnel can include features that guide the insertion of the wire into the solder sleeve. Block 506 can correspond to FIG. 4C.

After the wire and/or cable has been inserted into the solder sleeve, a slug of the wire and/or cable can be removed in block 508. The slug can be a portion of the wire and/or cable that was previously scored. Removal of the slug can correspond to FIG. 4E. Additionally, the solder sleeve can be heated and/or soldered to attach to the wire after the slug has been removed. In certain examples, the solder sleeve can be attached to the wire and/or cable in the location that the slug was removed from.

In block 510, the end effector releases the solder sleeve, the split funnel moves to a position that allows the solder sleeve to move through the split funnel, the solder sleeve grippers release the solder sleeve, and the split funnel and the end effector can be moved to retract the end effector and the split funnel from the solder sleeve and the wire. Block 510 can correspond to FIGS. 4F and 4G.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus for facilitating an insertion of a wire surrounded by shielding into a solder sleeve so as to prevent a dislocation of the shielding during insertion, wherein the shielding is encapsulated by insulation and wherein the insulation has been scored near a distal end to define a removable slug, comprising:

an end effector comprising:
    solder sleeve grippers, wherein the solder sleeve grippers are configured to move between at least a solder sleeve gripper open position and a solder sleeve gripper closed position configured to hold a solder sleeve;
    slug puller grippers, wherein the slug puller grippers are configured to move between at least a slug puller gripper open position and a slug puller gripper closed position configured to hold a portion of the removable slug, and wherein the solder sleeve grippers and the slug puller grippers are configured to move independently of each other; and
a split funnel, wherein the end effector is configured to move to a location proximate the split funnel and the split funnel comprises:
    a first portion; and
    a second portion, wherein the first portion and the second portion are configured to move between at least a first position and a second position, wherein, in the first position, the first portion and the second portion define at least one opening configured to allow movement of the wire through the split funnel, guide insertion of the wire into the solder sleeve, and prevent movement of the solder sleeve though the split funnel, and wherein, in the second position, the first portion and the second portion are configured to allow movement of the solder sleeve through the split funnel.

2. The apparatus of claim 1, further comprising a controller communicatively connected to the end effector and the split funnel, the controller configured to provide instructions to:
    close the solder sleeve grippers to the solder sleeve gripper closed position to hold the solder sleeve;
    move the end effector to the location proximate the split funnel;
    move the first portion and the second portion of the split funnel to the first position;

move the split funnel and/or the end effector to insert the wire into the solder sleeve held by the solder sleeve grippers;

close, responsive to insertion of the wire into the solder sleeve, the slug puller grippers to the slug puller gripper closed position to hold the removable slug;

move the end effector to remove the slug from the wire;

open the solder sleeve grippers to the solder sleeve gripper open position; and open the slug puller grippers to the slug puller gripper open position.

3. The apparatus of claim 2, wherein moving the end effector to remove the slug from the wire further comprises moving the end effector to move the solder sleeve on the wire to a soldering position.

4. The apparatus of claim 2, further comprising one or more heaters configured to solder the solder sleeve to the wire, and wherein the controller is further configured to provide instructions to:

solder the solder sleeve to the wire.

5. The apparatus of claim 2, wherein the controller is further configured to provide instructions to:

position the end effector proximate to a tape and reel and/or vibratory table containing the solder sleeve before moving the solder sleeve grippers to the solder sleeve gripper closed position to hold the solder sleeve.

6. The apparatus of claim 2, wherein the first portion and the second portion of the split funnel, in the first position, define a plurality of openings configured to prevent movement of the solder sleeve though the split funnel and allow movement of the wire through the split funnel and guide insertion of the wire into the solder sleeve.

7. The apparatus of claim 6, wherein the plurality of openings are different sized openings, wherein the split funnel is configured to move to align one of the different sized openings proximate the end effector, and wherein the controller is further configured to provide instructions to:

move the split funnel and/or the end effector to align the end effector to one of the different sized openings according to a size of the solder sleeve.

8. The apparatus of claim 7, wherein the controller is further configured to provide instructions to:

determine the size of the solder sleeve.

9. The apparatus of claim 2, wherein the controller is further configured to provide instructions to:

move the first portion and the second portion of the split funnel to the second position;

move the end effector away from the location proximate the split funnel; and move the split funnel and/or the end effector away from the wire and the solder sleeve inserted onto the wire.

10. The apparatus of claim 2, wherein moving the end effector to remove the slug from the wire comprises not deforming and/or minimally deforming shielding of the wire.

11. The apparatus of claim 1, wherein the at least one opening comprises a chamfered and/or rounded surface opposite the location proximate the split funnel that the end effector is configured to be moved toward.

12. The apparatus of claim 1, wherein the slug puller grippers comprise a pigtail opening configured to allow a pigtail of the solder sleeve to pass through when the slug puller grippers are in the slug puller gripper closed position.

13. A method for using the apparatus of claim 1 to insert the wire surrounded by the shielding into the solder sleeve without dislocating the shielding, wherein the shielding is encapsulated by the insulation and wherein the insulation has been scored near the distal end to define the removable slug, the method comprising:

closing the solder sleeve grippers of the end effector to the solder sleeve gripper closed position to hold the solder sleeve;

moving the end effector to the location proximate the split funnel;

moving the first portion and the second portion of the split funnel to the first position configured to prevent movement of the solder sleeve though the split funnel and allow movement of the wire through the split funnel;

moving the split funnel and/or the end effector to insert the wire into the solder sleeve held by the solder sleeve grippers;

closing, responsive to insertion of the wire into the solder sleeve, the slug puller grippers to the slug puller gripper closed position to hold the removable slug;

moving the end effector to remove the slug from the wire;

opening the solder sleeve grippers to the solder sleeve gripper open position; and opening the slug puller grippers to the slug puller gripper open position.

14. The method of claim 13, wherein moving the end effector to remove the slug from the wire further comprises moving the end effector to move the solder sleeve on the wire to a soldering position.

15. The method of claim 13, further comprising:
soldering the solder sleeve to the wire.

16. The method of claim 13, further comprising:
positioning the end effector proximate to a tape and reel and/or vibratory table containing the solder sleeve before moving the solder sleeve grippers to the solder sleeve gripper closed position to hold the solder sleeve.

17. The method of claim 13, wherein the first portion and the second portion of the split funnel, in the first position, define a plurality of different sized openings configured to prevent movement of the solder sleeve though the split funnel and allow movement of the wire through the split funnel, and wherein the method further comprises:

determining a size of the solder sleeve; and moving the end effector and/or the split funnel to align the end effector to one of the different sized openings according to the size of the solder sleeve.

18. The method of claim 13, further comprising:
moving the first portion and the second portion of the split funnel to the second position;

moving the end effector away from the location proximate the split funnel; and moving the split funnel and/or the end effector away from the wire and the solder sleeve inserted into the wire.

19. The method of claim 13, wherein moving the end effector to remove the slug from the wire comprises not deforming and/or minimally deforming shielding of the wire.

* * * * *